US006873913B2

United States Patent
Choo et al.

(10) Patent No.: US 6,873,913 B2
(45) Date of Patent: Mar. 29, 2005

(54) METHOD OF RECONSTRUCTING SEISMIC RECORDS TO OBTAIN HIGH RESOLUTION SIGNALS

(75) Inventors: Jason Chin Yew Choo, Calgary (CA); Jonathan E. Downton, Calgary (CA); Janet Katherine Dewar, Calgary (CA)

(73) Assignee: Paradigm Geophysical Corporation, Houston, TX (US)

( * ) Notice: Subject to any disclaimer, the term of this patent is extended or adjusted under 35 U.S.C. 154(b) by 0 days.

(21) Appl. No.: 10/667,037

(22) Filed: Sep. 22, 2003

(65) Prior Publication Data

US 2004/0117122 A1 Jun. 17, 2004

Related U.S. Application Data

(60) Provisional application No. 60/412,486, filed on Sep. 20, 2002.

(51) Int. Cl.[7] .................................................. G01V 1/28
(52) U.S. Cl. ....................................................... 702/17
(58) Field of Search ............................... 702/14, 16, 17, 702/18; 367/45, 46, 7

(56) References Cited

U.S. PATENT DOCUMENTS 3,496,529 A * 2/1970 Anstey et al. ................. 367/40
4,992,995 A * 2/1991 Favret ........................... 367/43
5,971,095 A * 10/1999 Ozbek ......................... 181/112
6,507,787 B1 * 1/2003 Filpo Ferreira Da Silva et al. ............................. 702/1

OTHER PUBLICATIONS

John P. Castagna; *AVO Analysis–Tutorial and Review*, in Backus, M. M., Ed., Offset–dependent reflectivity—theory and practice of AVO analysis: Soc. of Expl. Geophys., 1993, pp. 3–36, 26 Figs. 10 Tables.
Robert E. Sheriff; *Encyclopedic Dictionary of Exploration Geophysics, Third Edition*, 1991 Society of Exploration Geophysicists, Zoeppritz's equations:, pp. 337–338.

* cited by examiner

*Primary Examiner*—Donald McElheny, Jr.
(74) *Attorney, Agent, or Firm*—Madan, Mossman & Sriram, P.C.

(57) ABSTRACT

The present invention provides a method and system for processing an input seismic record to suppress noise energy, for example multiple energy, and to enhance signal. A primary signal component is determined from an input seismic record. A residual record is obtained from the input seismic record and the determined primary component record, for example, by determining a difference of the two records. A next primary signal component record is then obtained from the residual record. The primary component record and the next primary component record are combined to form a reconstructed record. A subsequent residual record may then be obtained and further primary signal components extracted.

20 Claims, 5 Drawing Sheets

Figure 1A: Raypaths

Figure 1B: Arrival-times before NMO

METHOD OF RECONSTRUCTING SEISMIC RECORDS TO OBTAIN HIGH RESOLUTION SIGNALS

This application claims priority from U.S. Provisional Patent Application No. 60/412,486 filed on Sep. 20, 2002.

FIELD OF THE INVENTION

The present invention relates to the field of geophysical prospecting and, more particularly, to a method and apparatus for obtaining enhanced seismographs of the earth's subsurface formations.

BACKGROUND OF THE INVENTION

In the oil and gas industry, geophysical prospecting using seismic surveying techniques are commonly used to aid in the search for and evaluation of subterranean hydrocarbon deposits. A seismic survey represents a well known technique to image or map the subsurface of the earth by sending seismic energy down into the ground and recording the echoes that return after traversing through and reflecting from the subsurface rock layers. The resulting seismic data may be processed to yield information relating to the location of the subsurface reflectors and the physical properties of the subsurface formations.

The source of the down-going seismic energy might be, for example, detonated explosions or seismic vibrators on land, or compressed air released from air guns in marine environments. During a seismic survey, an energy source is placed at various locations near the surface of the earth above a geologic region of interest. Each time the source is activated, it generates a seismic signal that travels downward through the earth, is reflected, and, upon its return, is recorded at many receivers at locations on the surface. Multiple source/recording combinations are then combined to create a near continuous profile of the subsurface that can extend for many miles. Many variations of the conventional source-receiver arrangement are used in practice, for example, VSP (vertical seismic profile) surveys, which are well known in the art. Many different field acquisition geometries and design considerations are well known by those skilled in the art.

A seismic survey is composed of a very large number of individual seismic recordings or traces. In a typical seismic survey, there will usually be several tens of thousands or even millions of traces. A modern seismic trace is a digital recording of the acoustic energy reflected from inhomogeneities or discontinuities in the subsurface, a partial reflection occurring each time there is a sufficient contrast in the elastic properties of the subsurface materials.

Digital samples are usually acquired at 0.002 second (2 millisecond) intervals, although 4 millisecond and 1 millisecond sampling intervals are also common. Each discrete sample in a conventional digital seismic trace is associated with a travel time. In the case of reflected energy, this represents a two-way travel time from the source to the reflector and back up to the surface receiver. Further, the surface location of every trace in a seismic survey is tracked and is made a part of the trace itself during standard data processing (as part of the trace header information). This allows the seismic information contained within the traces to be later correlated with specific surface and subsurface locations, thereby providing a means for posting and contouring seismic data—and attributes extracted therefrom—on a map (i.e., "mapping").

Seismic data provide a wealth of information for individuals skilled in interpretation to locate potential drilling locations. For example, a processed seismic survey gives a broad view of the structure (topography) of the subsurface rock layers and often reveals important features associated with the entrapment and storage of hydrocarbons such as faults, folds, anticlines, unconformities, salt domes, and reefs, among many others. During the computerized processing of seismic data, estimates of the velocities at which seismic energy is propagated through subsurface rocks are routinely generated and near surface inhomogeneities are detected and displayed. In some cases, seismic waveform attributes of processed data can be used to directly estimate rock porosity, water saturation, and hydrocarbon content. This is particularly true when seismic data are directly correlated to corresponding well log information. Seismic waveform attributes can often be empirically correlated with known hydrocarbon occurrences and these empirical correlations may be extrapolated to seismic data collected over new exploration targets.

Noise energy on seismic records is undesired energy that may be so strong as to interfere with or mask desired signals. Noise may be incoherent or random in nature. Random noise in a land seismic survey includes that due to wind, vehicular, or pedestrian traffic. In marine seismic surveys, random noise includes ship vibrations, surging of the hydrophone cable, flow noise of water around the cable and hydrophones, tugging of the cable by the tail buoy and activity of marine life.

Noise may also be coherent. Assuming that primary reflections from earth strata are the desired signals, coherent noise may comprise refractions, multiple reflections, reflected refractions or refracted reflections, diffractions from point sources on a rugose sea floor or from fault scarps, and coherent noise from mechanical sources such as the regular beating of a ship's screw.

Figure 1A:
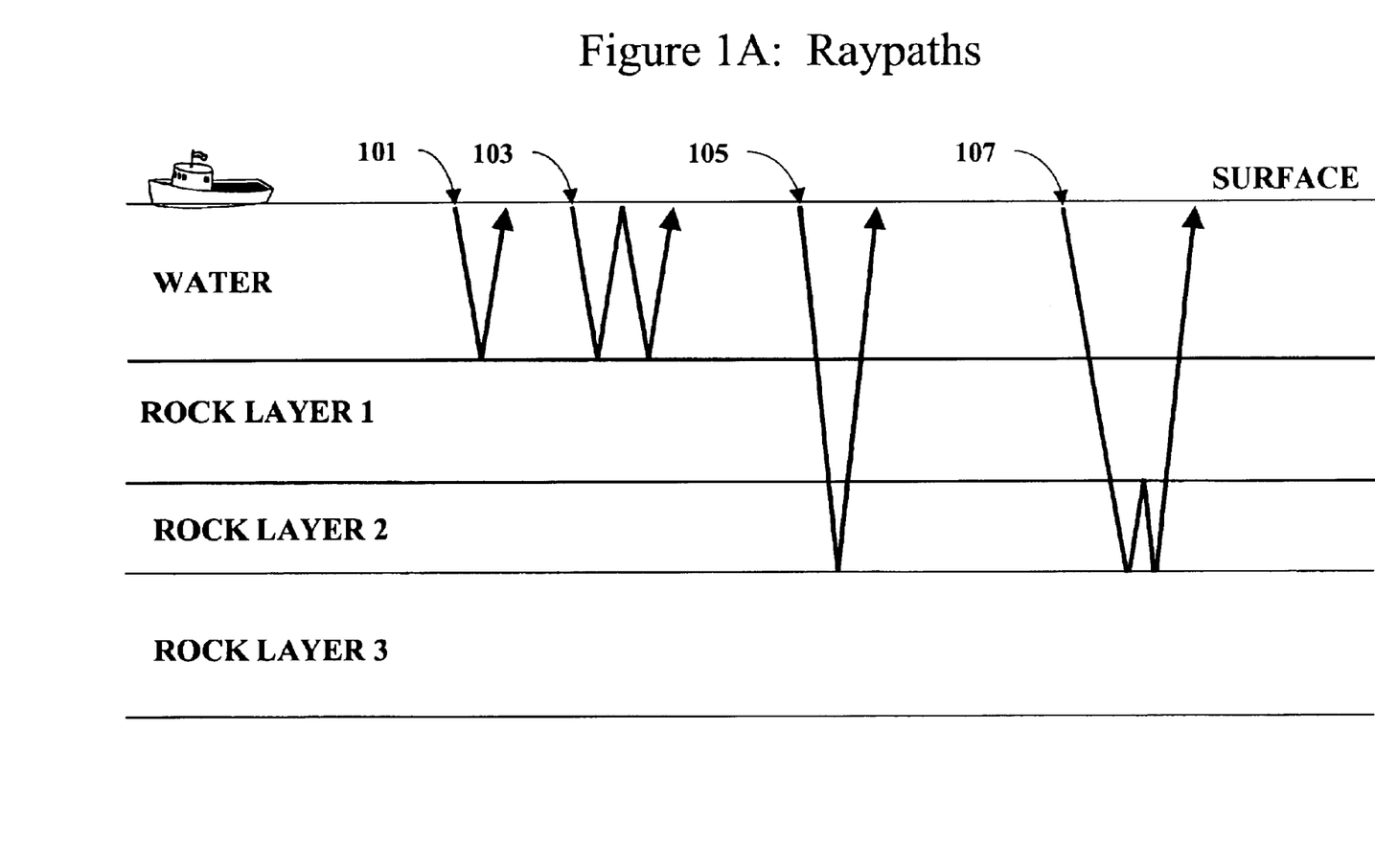
FIG. 1A illustrates various wave paths present in marine acquisition.

Multiple seismic arrivals (a form of coherent noise), as is well known to those skilled in the art, arise when seismic energy arrives at the surface after being reflected from more than one interface. For example, it is quite common in offshore settings to find that the original seismic signal "bounces" between the surface of the ocean and the ocean bottom a number of times during the seismic recording (FIG. 1A). This results in a repeating waveform that appears at regular time intervals throughout every recorded seismic trace (a "multiple"), the precise time separation being determined by the depth of the water, the velocity of sound in water at the recording location, and the source-receiver offset.

FIG. 1A illustrates various wave paths present in marine acquisition including multiples. Raypath 101 illustrates the path followed by a reflection from the ocean bottom. Ocean bottom reflections are often the strongest energy on seismic records. Raypath 103 illustrates an ocean water bottom multiple. A primary reflection from a rock layer is illustrated by raypath 105. These primary reflections are the data most seismic data processing is directed to enhancing.

Additionally, it is also common to find inter-bed multiples (107 in FIG. 1A) in both land and marine surveys. Inter-bed multiples occur when the seismic signal bounces up and down between rock layer interfaces. The appearance of this multiple arrival energy creates artificial ("ghost") seismic events that appear as geologic boundaries, but do not represent actual geological boundaries. There is a need for a method to remove these artificial events, while at the same time not removing or altering primary reflections from actual geological boundaries.

Figure 1B:
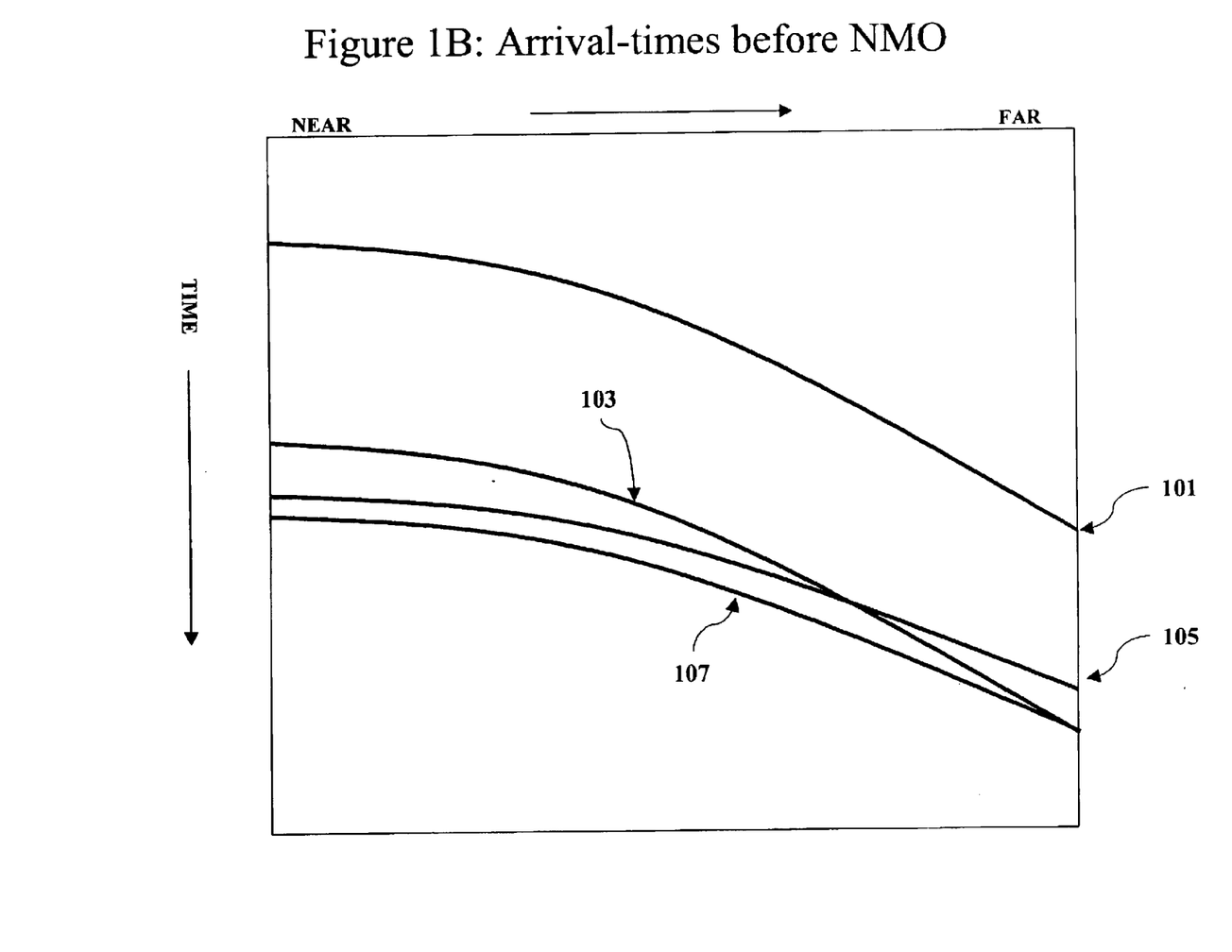
FIG. 1B and FIG. 1C schematically illustrates some primary and multiple reflection raypaths and the corresponding arrival time curves before and after NMO correction.
Figure 1C:
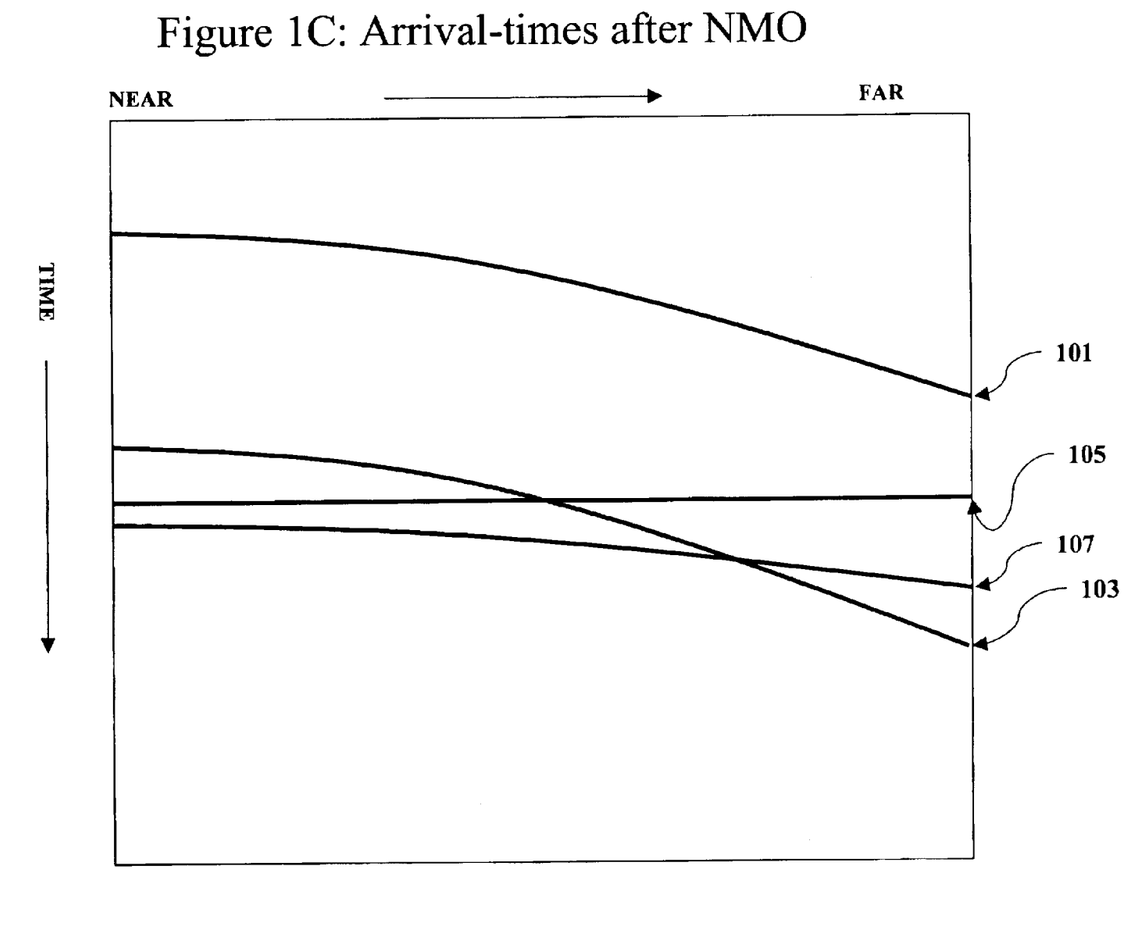

Frequency filtering is one method to remove some types of coherent noise. Frequency filtering is effective provided that the frequency spectrum of the noise does not overlap the frequency spectrum of the desired signal. However, coherent noise often exists within the same frequency spectrum as that of the desired signal. Other well-known methods of suppressing coherent noise include spatial filtering, mixing, common offset or common midpoint stacking, vertical or lateral data averaging, array forming and beam steering. Velocity filtering is useful provided the velocity (the normal move-out offset-time correction, dx/dt, known as NMO) of the desired signal is different than that of the apparent velocity of the contaminating noise (FIGS. 1B and 1C). The NMO values of multiples may be similar or indistinguishable from that of the primary desired seismic signal energy.

FIG. 1B illustrates a schematic of where relative seismic energy raypath arrival times will appear on shot records before NMO is applied. The water bottom arrival 101 is the first arrival in time, from NEAR to FAR offsets as labeled from left to right on the top of FIG. 1B. The water bottom multiple is often the next arrival, but since it has slower velocity, it will cross the primary arrival 105 at farther offsets. The water bottom 103 is often much stronger than the primary 105 and will mask the primary arrival signal. The interbed multiple 107 has nearly the same velocity as the primary 105 and can be difficult to distinguish.

FIG. 1C illustrates a schematic of where relative seismic energy raypath arrival times will appear on shot records after NMO is applied. The primary arrival 105 is illustrated by the flat or level reflector. The water bottom arrival 101 is still the first arrival in time, from NEAR to FAR offsets as labeled from left to right on the top of FIG. 1C. The relative reflector relationships remain the same as in FIG. 1B.

One type of seismic attribute analysis that has been given increasing attention in recent years is Amplitude-Variation-with-Offset ("AVO" hereinafter, or sometimes "AVA" Amplitude-Variation-with-Angle-of-incidence) analysis. Broadly speaking, the goal of AVO analysis is to make geologically legitimate offset-dependent reflectivity effects more easily visible. AVO analysis is also relevant to azimuthal-dependent reflectivity effects that may be found in some seismic data sets. The physical principle upon which AVO analyses are based is that the reflection and transmission coefficients at an acoustic impedance boundary are dependent on the angle at which the seismic signal strikes that boundary, and on the contrast in rock properties across the boundary. Thus, from analysing how the amplitude of a reflection varies with angle, one may infer elastic rock properties of the reflector. See the Zoeppritz Equations in Sheriff, R. E., 1991, Encyclopedic Dictionary of Exploration Geophysics: Soc. of Expl. Geophys. Press, 384 pages.

The variation of reflectivity with angle is true of all rock interfaces. The variation in reflectivity is according to the particular properties of the rocks at the reflecting boundary. By way of example, a sandstone with gas in its pore spaces would have different angle-dependent variations in reflection- and transmission-coefficients as the same sandstone with water in the pore spaces. Reflection and transmission coefficients are also different for different rock types, (such as limestone as compared with sandstone, for example). Thus, by examining variations in seismic amplitude versus incidence angle (or an equivalent spatial component, for example shot-receiver offset) it is sometimes possible to make inferences about the subsurface lithology and fluid content of a particular reflector that could not otherwise be obtained.

These effects can sometimes be identified visually by arranging the move-out corrected seismic traces from a single gather or from a composite of more than one conventional acquisition gather. The traces of the seismic gathers are sorted in order of increasing source-to-receiver offset. The amplitudes of a reflection at the near traces are compared with the amplitudes on more distant traces at the same reflection time. (See, for example, page 25 of "AVO Analysis: Tutorial & Review", by J. Castagna, appearing in Offset-Dependent Reflectivity—Theory and Practice of AVO Analysis, John Castagna and Milo Backus (editors), SEG Press, pp. 3–36, 1993, the disclosure of which is incorporated herein by reference). Alternatively, various quantitative AVO attributes may be calculated from the gather. By combining many of these attributes, entire sections or volumes may be formed that represent AVO effects.

AVO analysis involves fitting a parametric curve (i.e., a function characterized by one or more constant coefficients, usually of some form of the Zoeppritz Equations) to seismic amplitudes of a seismic gather. Often, the typical parametric representation is used to model and account for compressional or "P" type reflections in the seismic data. When other seismic propagation modes are present, the fitted curve may fail to adequately model the seismic data, which might potentially lead to false or masked hydrocarbon indicators.

By way of explanation, elastic seismic energy propagates through the earth in one of two modes: compressional or "P" waves and shear or "S" waves, either of which might be generated by a wide variety of seismic sources. "Converted waves" are those waves that travel first as one type of wave and then are converted to the other, the conversion between wave-types happening at any seismic discontinuity. "Primary" reflections are P-mode waves that are reflected only once from a subsurface rock interface. Multi-path reflections are reflected more than once.

In conventional AVO analysis, these converted and multi-path reflections are regarded as coherent noise and so are attenuated—to the extent possible—during pre-processing prior to AVO analysis. However, this attenuation is imperfect and invariably at least some energy from the unwanted modes is not successfully attenuated. This unwanted, unattenuated noise energy has the potential to mask the desired signal and even create false signals that appear valid. Additionally, these modes can cause misinterpretations of the recorded seismic data and could lead to imperfect model of the subsurface.

Heretofore, as is well known in the seismic processing and seismic interpretation arts, there has been a need for a method and apparatus for identifying and extracting or suppressing unwanted noise energy from the traces in a seismic survey. Additionally, this method and apparatus should provide for improved attribute analyses and interpretation of seismic data. Accordingly, it should now be recognized, as was recognized by the present inventors, that there exists a need for a method and apparatus of seismic data processing to address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

The present invention provides a method and apparatus for processing an input seismic record to suppress noise energy, for example multiple energy, and to enhance signal. A primary signal components is determined from an input seismic record. A residual record is obtained from the input seismic record and the determined primary components record, for example, by determining a difference of the two records. A next primary signal components record is then obtained from the residual record. The primary components record and the next primary components record are combined to form a reconstructed record. A subsequent residual record may then be obtained and further primary signal components extracted.

BRIEF DESCRIPTION OF THE DRAWINGS

The present invention and its advantages will be better understood by referring to the following detailed description and the attached drawings in which.

While the invention will be described in connection with various embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION

The present invention provides a method and apparatus for removing unwanted acoustic energy from seismic records while preserving a significant portion of the underlying desired signal energy. Additionally, the method may also include constructively utilizing acoustic energy usually treated as noise in a manner to enhance and strengthen the ratio of primary seismic signal energy to noise energy (the signal-to-noise ratio). Accordingly, while suppressing multiples and other noise, this invention preserves and restores signal energy present in the original data, although much of the energy may have been masked by noise energy. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

It commonly observed that seismic waves propagating through the earth sometimes are trapped between layers and bounce around these trapped layers and/or bounce around from water surface to water bottom thereby creating what is commonly known (and described previously herein) in the industry as intra-bed multiples or water bottom multiples. Two of the methods practiced in the industry for removing this coherent noise are the Radon transform method and the Wave Equation Multiple attenuation method. When we have cases where the topography of the sea floor is not smooth, but instead is undulating, the water-bottom multiple will not be hyperbolic in t-x space. In such situations, the above methods fail because they require multiple events to be hyperbolic.

When examining primary arrival seismic wave energy (for example, primary reflections from the water bottom in marine seismic records) and the corresponding multiple reflections (the second bounce of the water bottom multiple, third bounce, and so on), the shape of the multiple is known to be different that the shape of the primary reflector that generates it. This means that the multiple reflection event will be non-hyperbolic in the t-x seismic records, and therefore conventional noise attenuation like Radon transform methods cannot remove these multiples completely. An embodiment of the present invention combines a Radon de-multiple (or conventional equivalent) with an AVO-projection method to take advantage of the strengths of each technique and limit the artifacts remaining in the seismic data.

The method and apparatus described below may be constructively applied to remove residual multiple energy that is left behind after application of one or both of the above methods. This method uses various techniques to predict the signal content and examines continuously how well it has predicted the signal by examining the difference between the actual recorded signal and the predicted signal. Statistical measures of the goodness-of-fit between an actual signal versus a predicted signal guide the process.

One embodiment of the present invention simultaneously models seismic data signal and coherent noise and then in a nonlinear adaptive fashion, attenuates coherent and random noise. The signal may be modeled in a variety of ways, for example by a linear approximation of Zoeppritz's equations. Coherent energy likewise can be modeled in a variety of ways, for example, conventional techniques such as the Radon transform to model multiples, or an AVO projection technique as disclosed herein. The nonlinear adaptive attenuation and coherent noise suppression of the present invention provides better amplitude preservation as well as providing pre-conditioning for pre-stack time migration (PSTM) and pre-stack depth migration (PSDM) processes.

The method of the present invention uses a Projection Technique for various types of noise, such as AVO-Projection for multiple and noise attenuation. By way of explanation, the AVO projection technique makes use of the fact that the assumptions of Zoeppritz's equations differ from the real-world seismic wavefronts that travel in the subsurface. Zoeppritz's equations describe plane waves and apply to a reflection between two half-spaces, and so do not include wavelet interference effects caused by layering. AVO analysis uses Zoeppritz's equations (or some linear approximation of the equations) to describe pre-stack amplitude behavior. Due to the assumptions of Zoeppritz, a Zoeppritz-based AVO inversion of modeled compressional wave signals treats multiples and converted waves as noise. That is, the AVO analysis will see multiples as noise, and will exclude them in its reconstruction One application that comprises an AVO Projection Technique begins with the linearized AVO model where any of the Zoeppritz equation form being inverted for is expressed in matrix form Gm=d where G is the linear operator, m the unknown parameter vector containing the velocity and density reflectivity $[\Delta\alpha/\alpha, \Delta\beta/\beta, \Delta\rho/\rho]^T$ and d the input data vector (offset dependent reflectivity). From this formulation we can estimate and suppress noise from original data in an adaptive nonlinear fashion.

In their classic form, Zoeppritz's equations are often considered unwieldy to apply in AVO analysis. As an alternative, one of the many simplified approximations of Zoeppritz's equations, some developed for their stability, may be fit to the observed pre-stack amplitudes. For example, we may fit Shuey's familiar approximation:

$$R(\theta) = A + B\sin^2\theta + C(\tan^2\theta - \sin^2\theta) \quad (1)$$

where $$A = Rp = \frac{1}{2}\left[\frac{\Delta Vp}{Vp} + \frac{\Delta\rho}{\rho}\right]$$

$$B = \frac{1}{2}\left[\frac{\Delta Vp}{Vp} - 2\left(\frac{Vs}{Vp}\right)^2\right]\left[2\frac{\Delta Vs}{Vs} + \frac{\Delta\rho}{\rho}\right]$$

$$C = \frac{1}{2}\left(\frac{\Delta Vp}{Vp}\right)$$

or Fatti et al's two term approximation:

$$R(\theta) = \frac{1}{2}\left(\frac{\Delta Ip}{Ip}\right)(1 + \tan^2\theta) - 4\left(\frac{Vs}{Vp}\right)^2\left(\frac{\Delta Is}{Is}\right)\sin^2\theta \quad (2)$$

to the observed pre-stack amplitudes. For example Fatti's equation may be fit to the observed pre-stack amplitudes (R(θ) in Equation 2) to estimate P- and S-reflectivity (ΔIp/Ip and ΔIs/Is in Equation 2). Once this equation is solved, the seismic gather may be reconstructed using the result.

Figure 2A:
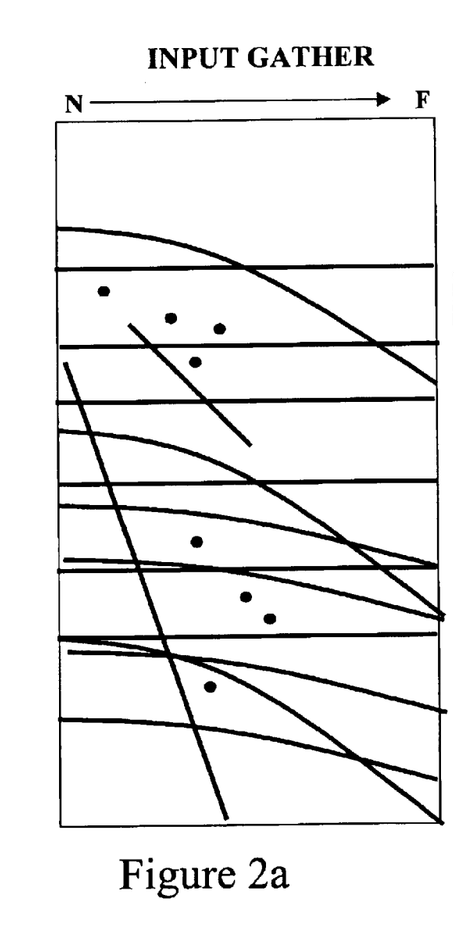
FIG. 2A schematically illustrates a typical multiple-laden gather.
Figure 2B:
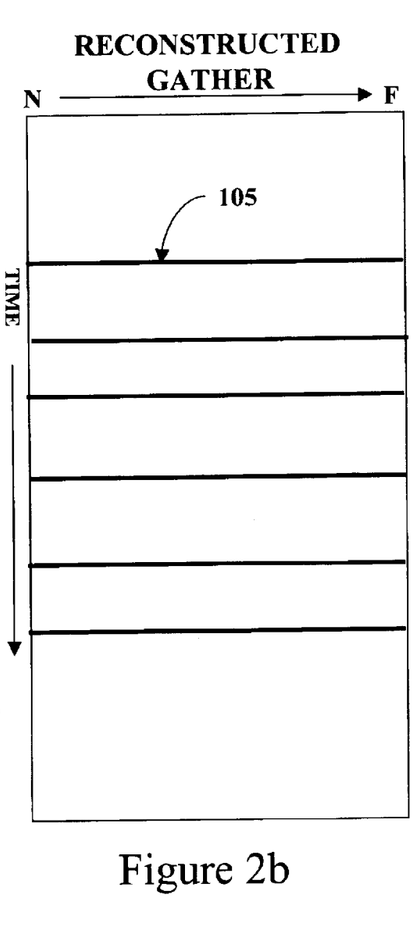
FIG. 2B schematically illustrates a reconstructed gather.
Figure 2C:
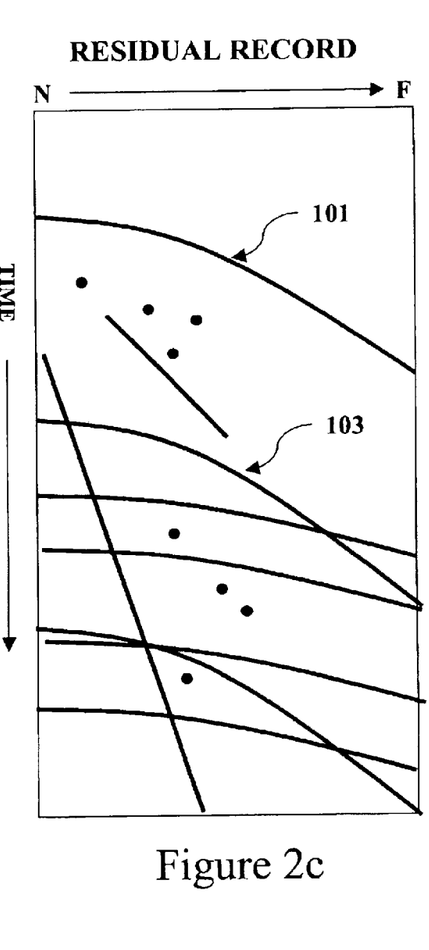
FIG. 2C schematically illustrates a residual record.

Application of AVO-Projection technique is illustrated with a schematic of a typical multiple-laden gather (FIG. 2A). The P- and S-reflectivities are extracted via fitting to a form of the Zoeppritz equation, for example Fatti's equation, then with the equation solved, the primary signal energy of the gather is reconstructed. Multiples in the input gather will not be modeled by the AVO equation and will not be reconstructed. FIG. 2B shows the reconstructed gather. An example primary arrival 105 is properly modeled by the AVO equation. FIG. 2C is a "input-minus-reconstruction gather" or Residual Record that shows the difference between the input gather and the reconstructed gather. Examples of noise in FIG. 2C include a water bottom arrival 101 and a water bottom multiple arrival 103. Note that while the seismic event energy in the Residual Record of FIG. 2C have not been included in the Reconstructed Gather of FIG. 2B, a different modeling can extract signal from the residual record.

The input-minus-reconstruction gather illustrates what is considered noise by the (initial modeling of the) AVO equation. The input-minus-reconstruction gather is referred to herein as a Residual Record. The multiples and other noise appear in FIG. 2C on the difference display (Residual Record), which indicates that multiples and noise are being excluded by the AVO reconstruction. In this way, the AVO Projection technique can be considered a multiple and noise attenuator.

The method of the present invention utilizes a Projection Technique for various noise problems, such as in AVO-Projection for multiple and noise attenuation. Input seismic data, being data at any stage of processing after acquisition, comprises signal and noise which can be processed by the method and apparatus of the present invention and the output will be seismic data comprising signal with less noise. For example, as has been disclosed here, it has been found that multiple energy can be effectively removed from the data.

Figure 3:
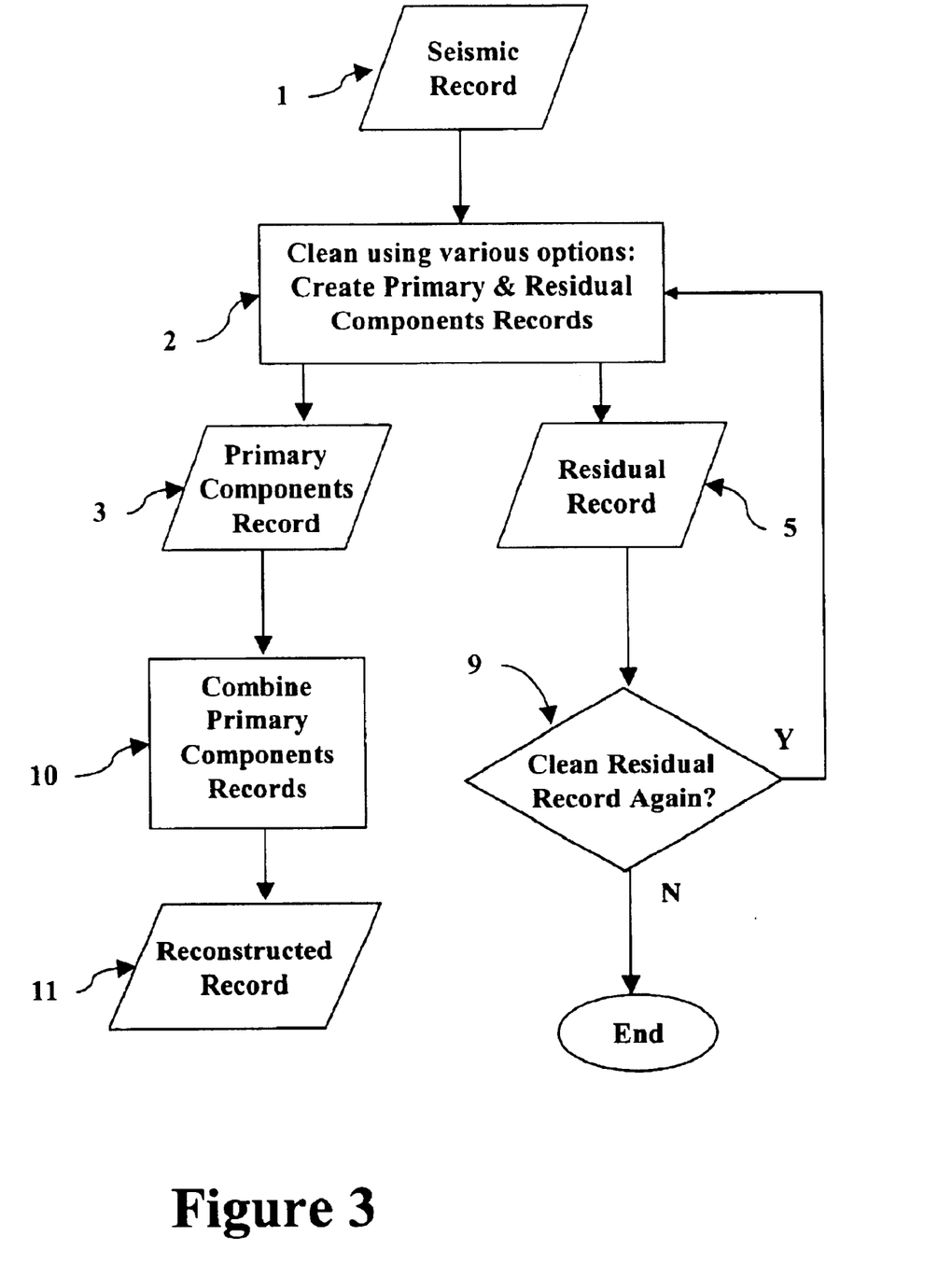
FIG. 3 illustrates a flow chart of the present invention.

A flow chart showing an embodiment of the present invention is illustrated by the flow chart of FIG. 3. The seismic data to be processed, called Input Seismic Record data 1 may be raw data or data that have had seismic processing applied, for example Radon de-multiple can have been applied. Seismic data are input to the 'cleaning' of 2. The term cleaning refers to signal extraction and noise separation. Signal extraction includes processes like the Radon de-multiple or the AVO projection technique described above, or another filtering or inversion technique to extract signal components from the seismic record. The 'cleaning' also includes determining which of the data are left over after the signal extraction.

Step 2 produces two outputs, a Primary Components Record 3 (signal) and Residual Record 5 (noise and signal). The Primary Components Record 3 is signal that has been extracted from the original Input Seismic Record 1 by the cleaning. Primary Components Record 3 is then passed on to step 10 where it is combined with any other Primary Components Records. The Residual Record 5 represents all the data not extracted from the Primary Components Record. Since it is unlikely that any one cleaning option will extract the entire signal present in a seismic record, Residual Record 5 will contain both signal and noise. The Primary Components Record 3 may be subtracted from the original Seismic Record 1 to form the Residual Record 5.

To summarize step 2 using Seismic Record 1: The Seismic Record 1 is filtered to extract the Primary Components Record 3. The Primary Components Records 3 is combined (for example by subtraction) with the original Seismic Record 1 to form Residual Record 5.

After Residual Record 5 has been formed, the record is examined 9 to determine whether to extract any remaining signal still present. To recover signal still present in the Residual Record 5, it is then cleaned 2 by, for example, a method equivalent to the cleaning option used in 2 for the original Seismic Record 1, or a similar method adapted for the residual energy of the data. For example, if an AVO projection technique that was based on multiple arrivals of compressional signals was used for 2 on the original record 1, another AVO projection technique for shear waves may be applied for step 2 when the Residual Record 5 is input to step 2. Those skilled in the art will be able to recognize by the data characteristics of the Seismic Record 1 and the Residual Record 5 (for each iteration) which signal extraction, inversion or filtering technique to apply in 2.

Whether the input to step 2 is the original Seismic Record 1 or the Residual Record 5, the output of the cleaning step 2 each time is a Primary Components Record 3 as well as a Residual Record 5. When the input to step 2 is the Seismic Record 1 the signal output is referred to as a "primary components record," when the input to step 2 is a Residual Record the output is referred to as a "next primary components record" or a "subsequent primary components record." The Residual Record 5 is then examined to determine whether to apply the cleaning step 2 again. The first Residual Record 5 output from step is referred to as a "residual record" and after a Residual Record 5 has been used as input to step 2 the Residual Record is referred to as a "subsequent residual record" or as a "next residual record." The subsequent or next residual records may be formed by subtracting the input Residual Record 5 to step 2 from the newly determined Primary Components Record 3, or alternatively, by subtracting the Reconstructed Record 11 from original Seismic Record 1. Those skilled in the art will be able to determine which combination to use.

The Primary Components Record 3 will contain desired seismic signal that can then be combined 10 with any previously determined Primary Components Records 3 to form a Reconstructed Record 11. When it has been determined that any subsequent residual records will not be cleaned, the flow ends.

In another embodiment, the present invention is implemented as a set of instructions on a computer readable medium, comprising ROM, RAM, CD ROM, Flash or any other computer readable medium, now known or unknown that when executed cause a computer to implement the method of the present invention. The invention may be embodied in a computer system comprising a data reading device, memory and a processor with code to operate on the seismic data, perform data processing instructions and save the results for display and further processing.

Persons skilled in the art will understand that the methods described herein may be practiced as set out in the specification, figures and claims, including but not limited to the embodiments disclosed. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method of processing an input seismic record comprising:
    (a) determining a primary components record from the input seismic record;
    (b) obtaining a residual record from the input seismic record and the primary components record;
    (c) obtaining a next primary components record from the residual record; and
    (d) combining the primary components record and the next primary components record to obtain a reconstructed record.

2. The method of claim 1 further comprising obtaining a subsequent residual record from at least one of: (i) the reconstructed record; (ii) the input seismic record; and (iii) the residual record.

3. The method of claim 2 further comprising obtaining a subsequent primary components record from the subsequent residual record.

4. The method of claim 3 further comprising combining the subsequent primary components record with at least one of:
    i) said primary components record;
    ii) the next primary components record;
    iii) the subsequent primary components record;
    iv) the residual record; and
    v) the subsequent residual record.

5. The method of claim 1 wherein the input seismic record further comprises at least one of:
    i) shot gathers,
    ii) receiver gathers,
    iii) cdp super-gathers,
    iv) Ostrander gathers,
    v) reconstructed record gathers,
    vi) offset gathers; and
    vii) angle gathers.

6. The method of claim 1 wherein determining a primary components record and a next primary components record further comprises processing with one of: (i) a data projection technique; (ii) an AVO projection technique, (iii) a multiple attenuation process, (iv) a Radon transform, (v) statistical thresholding methods, and (vi) wavefield separation methods.

7. The method of claim 1 wherein obtaining said residual record from the input seismic record and the primary components record further comprises determining a difference between the seismic record and the primary components record.

8. The method of claim 1 wherein combining the primary components record and the next primary components record comprises adding the primary components and the next primary components record.

9. The method of claim 1 further comprising using statistical methods to determine the goodness of fit between a modeled signal and at least one of: i) the residual record; ii) the primary components record; iii) the next primary components record; and iv) the reconstructed record.

10. A computer readable medium containing executable instructions that when executed by a computer perform a method for processing an input seismic record comprising:
    (a) determining a primary components record from the input seismic record;
    (b) obtaining a residual record from the input seismic record and the primary components record;
    (c) obtaining a next primary components record from the residual record; and
    (d) combining the primary components record and the next primary components record to obtain a reconstructed record.

11. The medium of claim 10 further comprising instructions for obtaining a subsequent residual record from at least one of: (i) the reconstructed record; (ii) the input seismic record; and (iii) the residual record.

12. The medium of claim 11 further comprising instructions for obtaining a subsequent primary components record from the subsequent residual record.

13. The medium of claim 12 further comprising instructions for combining the subsequent primary components record with at least one of: i) said primary components record, and ii) next primary components record.

14. The medium of claim 10 further comprising instructions for selecting from at least one of the group seismic gathers comprising at least one of: (i) shot gathers, (ii) receiver gathers, (iii) cdp super-gathers, (iv) Ostrander gathers, (v) reconstructed record gathers, (vi) offset gathers, and (vii) angle gathers.

15. The medium of claim 10 further comprising instructions for determining a primary components record and a next primary components record including processing with one of (i) a data projection technique; (ii) an AVO projection technique, (iii) a multiple attenuation process, (iv) a Radon transform, (v) statistical thresholding methods, and (vi) wavefield separation methods.

16. The medium of claim 10 further comprising instructions for obtaining a residual record from the input seismic record and the primary components record by determining a difference between the seismic record and the primary components record.

17. The medium of claim 10 further comprising instructions for combining the primary components record and the next primary components record by adding the primary components record and the next primary components record.

18. The medium of claim 10 further comprising instructions for using statistical methods to determine the goodness of fit between a modeled signal and at least one of: i) the residual record; ii) the primary components record; iii) the next primary components record; and iv) the reconstructed record.

19. A computer system comprising:

(a) a reading device to read stored seismic data;

(b) a processor;

(c) a memory;

(d) code for determining a primary components record from an input seismic record;

(e) code for obtaining a residual record from the input seismic record and the primary components record;

(f) code for obtaining a next primary components record from the residual record; and (g) code for combining the primary components record and the next primary components record to obtain a reconstructed record.

20. A machine readable medium having stored thereon code for:

(a) determining a primary components record from an input seismic record;

(b) obtaining a residual record from the input seismic record and the primary components record;

(c) obtaining a next primary components record from the residual record; and (d) combining the primary components record and the next primary components record to obtain a reconstructed record.

* * * * *